United States Patent

[11] 3,540,741

| [72] | Inventor | Arthur H. LeFebvre<br>Washington Township, New Jersey |
|---|---|---|
| [21] | Appl. No. | 760,597 |
| [22] | Filed | Sept. 18, 1968 |
| [45] | Patented | Nov. 17, 1970 |
| [73] | Assignee | Singer-General Precision, Inc.,<br>Little Falls, New Jersey<br>a corporation of Delaware |

[54] SEAL ASSEMBLY FOR A HYDRAULICALLY OPERATED CYLINDER
5 Claims, 1 Drawing Fig.

[52] U.S. Cl. ..................................................... 277/28,
92/154, 92/156, 92/168
[51] Int. Cl. ....................................................... F16k 41/00,
F01b 31/10
[50] Field of Search............................................ 92/165,
168, 154, 156; 184/24, 26, 28; 277/59; 137/539.5

[56] References Cited
UNITED STATES PATENTS

| 2,398,910 | 4/1946 | Pontius.......................... | 92/156 |
| 2,856,249 | 10/1958 | Leman.......................... | 92/171X |
| 3,216,651 | 11/1965 | King et al...................... | 277/59X |
| 3,293,994 | 12/1966 | Napolitano.................... | 92/165X |
| 3,357,707 | 12/1967 | Whittle et al. ................ | 277/59X |
| 3,377,073 | 4/1968 | Harney.......................... | 277/59X |
| 3,003,423 | 10/1961 | Drutchas...................... | 137/539.5X |
| 3,236,256 | 2/1966 | Valentine..................... | 137/539.5X |
| 3,447,564 | 6/1969 | North et al.................... | 137/539.5X |

Primary Examiner—Martin P. Schwadron
Assistant Examiner—Leslie J. Payne
Attorney—S.A. Giarratana, G.B. Oujevolk and S.M. Bender ABSTRACT: A seal assembly for a hydraulically operated cylinder comprising a pair of spaced sealing members acting on the operating shaft to seal the hydraulic operating fluid from the ambient fluid. Means are provided to supply the operating fluid to the space between the sealing members, and control the pressure differentials across each of the sealing members.

Patented Nov. 17, 1970
3,540,741
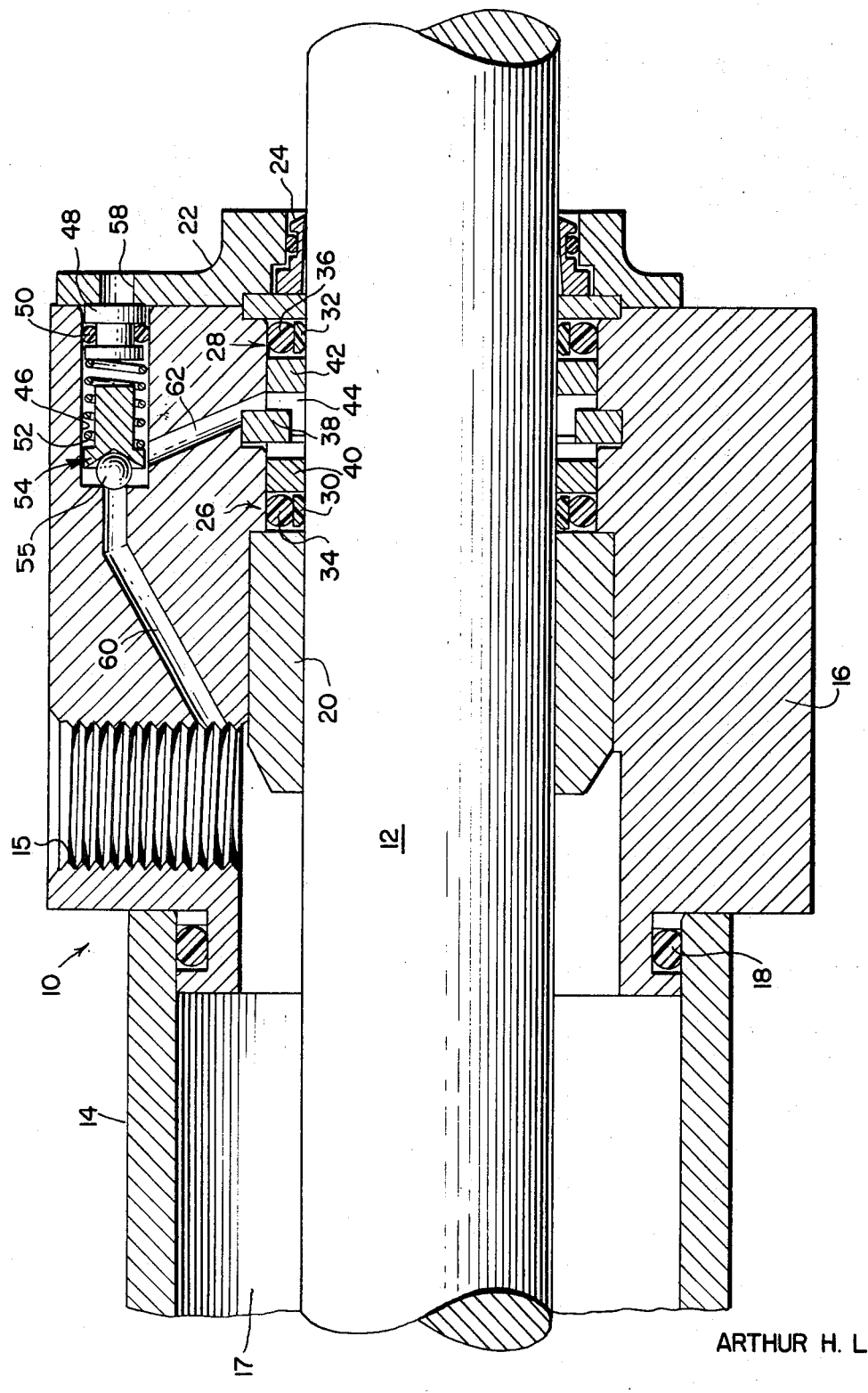
INVENTOR
ARTHUR H. LEFEBVRE
BY S. A. Giornatana
ATTORNEY

SEAL ASSEMBLY FOR A HYDRAULICALLY OPERATED CYLINDER

This invention relates to a device for sealing the operating shaft in a hydraulically operated cylinder and, more particularly, to such a device in which a pair of seals are provided to prevent the ambient fluid from leaking into the cylinder and contaminating the operating fluid.

Although it is generally known to provide a pair of seals to perform the above sealing function in such an arrangement, these proposals normally utilize a drain vent from a chamber between the two seals to dispose of leakage from either seal. However, this requires an environment into which the drained fluid can be discharged. Therefore, in applications requiring an operating environment which cannot accommodate or receive the leakage, severe operational limitations are imposed. This problem becomes particularly acute, for example, when hydraulically operated cylinders are operated under water, since there is clearly no intermediate atmosphere to receive the shaft seal leakage. Thus, a contamination of the operating fluid by leakage of water into the cylinders through the shaft seal interface may occur, which will severely limit the operation of the cylinder.

SUMMARY OF THE INVENTION

It is therefore an object of the present invention to provide a seal assembly for a hydraulically operated cylinder which minimizes leakage through the shaft seal interface, even under severe ambient conditions.

Briefly summarized, the seal assembly of the present invention includes a pair of spaced sealing members for sealing the operating shaft in a hydraulically operated cylinder, with means being provided to supply the operating fluid from the cylinder to the space between the sealing members and control the pressure differentials across the latter.

BRIEF DESCRIPTION OF THE DRAWINGS

Reference is now made to the accompanying drawing for a better understanding of the nature and objects of the seal assembly of the present invention, which drawing illustrates the best mode presently contemplated for carrying out the objects of the invention and its principles, and is not to be construed as restrictions or limitations on its scope. The drawing is a vertical cross-sectional view depicting the seal assembly of the present invention in use on a hydraulically operated cylinder.

Referring specifically to the drawing, the reference numeral 10 refers to a hydraulically operated cylinder which is designed to operate under high pressure ambient conditions, such as under water, and which has an operating shaft 12 adapted to reciprocate within a cylinder 14 by means of operating fluid being injected at a high pressure through an inlet port 15 into an operating chamber 17 to drive a piston (not shown) fixed to the operating shaft 12. An end cap member 16 extends over the shaft 12 and is sealingly connected to an end of the cylinder 14 by means of a ring seal 18. A bushing 20 is disposed in a groove formed in the end cap member 16, and an end plate 22 is provided on the end of the end cap member 16, with a scraper ring 24 extending between the plate 22 and the shaft 12.

A pair of rod sealing assemblies 26 and 28 are provided between the end cap member 16 and the shaft 12 to seal the operating fluid in the chamber 17 from the ambient water. These rod sealing assemblies 26 and 28 comprise sealing caps 30 and 32, respectively, in sealing engagement with the shaft 12 and backed by O-rings 34 and 36, respectively. A trapped split thrust ring 38 is provided between the shaft sealing assemblies 26 and 28 in a notch formed in the inner wall of the end cap member 16. This thrust ring, along with a pair of retaining rings 40 and 42 disposed between the thrust ring and the rod sealing assemblies 26 and 28, respectively, isolate the latter from each other. The retaining rings 40 and 42 are configured to define a plurality of intermediate chambers 44 for containing operating fluid, for reasons that will be described in detail later.

An axially extending chamber 46 is provided in the end cap member 16 and contains a flanged piston 48 adapted for slidable movement therein and carrying a seal ring 50, which engages the inner wall of the chamber 46. The piston 48 is operatively connected, by means of a compression spring 52, to a movable check valve assembly 54 which includes a ball valve member 55.

The chamber 46 is vented to the ambient water by means of an opening 58 formed in the end plate 22, and is connected with the operating chamber 17 and the intermediate chamber 44 by means of passages 60 and 62, respectively, extending through the end cap member 16. The force of the spring 52 is such as to bias the valve member 55 into a position where it will close the passage 60 under conditions that will be described in detail later.

In operation, an initial charge of operating fluid is placed in the intermediate chamber 44 and the passage 62, and the operating shaft 12 is reciprocally driven by alternately injecting operating fluid at a high pressure into the operating chamber 17 through the port 15, and discharging the fluid at approximately the ambient water pressure.

It will be appreciated from the above that, in an underwater environment under static conditions, the valve member 55 is held closed against the end of the passage 60 by the biasing spring 52, and the pressure imposed upon the fluid in the intermediate chamber 44 is controlled by this valve member and the pressurizing piston 48 which is vented to the ambient water. Therefore, the fluid in the intermediate chamber 44 is at the same pressure as the ambient water pressure less the effect of the valve member force on the pressurizing piston. This, in turn, substantially minimizes the pressure differential across the outboard seal assembly 28, which in turn, reduces the tendency for the ambient fluid to leak into the operating fluid in the intermediate chamber 44.

During the "drive" stroke of the operating shaft 12 caused by the operating fluid being injected into the intermediate chamber 17 at a pressure higher than that of the ambient fluid, the operating fluid pressure will exceed the biasing force acting on the valve member 55 and cause the latter to open to connect the intermediate chamber 44 with the operating chamber 17. Thus, if any operating fluid is needed in the chamber 44, due to prior leakage, etc., it will be replenished from the supply in the chamber 17. On the return stroke of the operating shaft 12, the pressure in the operating chamber 17 will reduce to substantially the ambient water pressure and, since the pressure exerted on the valve member 55 in its open position is equal to the ambient water pressure plus the force of the spring 52 acting on the valve member, the latter will close.

It is apparent from the above that, according to the present invention, during the drive stroke of the shaft 12, the pressure of the fluid in the intermediate chamber 44 will be higher than the ambient water pressure and the latter will thus be excluded from the chamber 44. Also, under all operating conditions, the pressure differential across the inboard seal assembly 26 will never be greater than that of the biasing force acting on the valve member 55 and, even if leakage does occur across this seal assembly, it is of little consequence, since identical fluids are involved.

It is emphasized that the above embodiment is shown only by way of example, and many variations thereof can be effected without departing from the basic inventive concept.

For example, the piston and operating shaft motion may be rotary and/or the cylinder may be movable with respect to the piston. Further, the above mentioned sealing members, including the fluid in the intermediate chamber 44, may be located in the shaft rather than externally thereof, and the cavity 46 may extend in a radial, rather than axial, direction.

Of course, other variations of the specific construction and arrangement of the seal assembly disclosed above can be made by those skilled in the art without departing from the invention as defined in the appended claims.

I claim:

1. A hydraulic assembly comprising a housing member having a chamber, an operating shaft member extending through said chamber and said housing member into an outside fluid under ambient pressure, and means for supplying operating fluid into said chamber to cause relative movement between said members, a pair of spaced sealing means disposed between said members to seal said chamber from the ambient fluid, each of said sealing means being displaced with respect to each other for defining a space therebetween, supply means carried by one of said members and responsive to a predetermined operating fluid pressure in said chamber for supplying operating fluid to the space between said sealing means, said fluid supply means comprising a passage formed in said one of said members for connecting said space with said chamber, and pressure responsive valve means disposed in said passage for permitting the flow of operating fluid from said chamber to said space only when said operating fluid exceeds said predetermined operating pressure, said valve means further including means for closing off said passage and for transmitting the pressure of said ambient fluid outside said housing to the fluid in said space when said predetermined operating pressure falls below that of said ambient pressure whereby said operating fluid pressure in said space is always at least as great as that corresponding to said outside ambient pressure.

2. The hydraulic assembly of claim 1 wherein said passage formed in said one of said members comprises a hollow bore having an inlet port at one end thereof communicating with said chamber and an outlet port substantially adjacent said inlet port communicating with said space, and wherein said valve means includes a piston member mounted in said hollow bore for slidable movement therein, said piston having a pair of opposed ends, one of said opposed ends being in normal sealing engagement with said inlet port and the other of said opposed ends being exposed to said ambient fluid whereby when said predetermined operating pressure exceeds said ambient fluid pressure said piston will be slidably moved within said hollow bore thereby opening said inlet port and permitting said operating fluid to flow through said outlet port into said space.

3. The hydraulic assembly of claim 2 wherein said opposed ends of said piston member are resiliently coupled together whereby when said one opposed end of said piston member is in normal sealing engagement with said inlet port said fluid operating pressure in said space will be determined substantially by said outside ambient fluid pressure acting on said other opposed end of said piston member.

4. The hydraulic assembly of claim 1 in which said housing member includes a cylinder cap member having a bore therein for receiving said operating shaft member, and wherein said sealing means are positioned in said bore for providing a slidable seal between the wall of said bore and said operating shaft member, each of said sealing means comprising a ring seal carried by said operating shaft member and sealingly engaging said cylinder cap member; said hydraulic assembly further including a trapped split thrust ring mounted on said cylinder cap member between said sealing means, and a pair of retaining rings disposed between said thrust ring and each of said sealing means to isolate the loads on each of said sealing means from the other.

5. A hydraulic assembly comprising a housing member having a chamber, an operating shaft member extending through said chamber and said housing member into an outside fluid under ambient pressure, and means for supplying operating fluid into said chamber to cause relative movement between said members; wherein the improvement comprises a pair of sealing means displaced with respect to each other for defining a space therebetween, said pair of spaced sealing means acting between said members to seal said operating fluid from the ambient fluid, supply means carried by one of said members and responsive to a predetermined operating fluid pressure in said chamber for supplying fluid to the space between said sealing means to act on the other of said members, said supply means comprising a passage formed in said one of said members and connecting said space with said chamber, and pressure responsive valve means disposed in said passage and adapted to permit the flow of operating fluid from said chamber to said space under said predetermined operating pressure, said valve means including means for transmitting the pressure of said ambient fluid outside said housing to the fluid in said space when said predetermined operating pressure falls below that of said ambient pressure wherein said pressure responsive valve means comprises a cavity formed in one of said members, said cavity registering with said space and containing operating fluid, a piston member sealingly mounted in said cavity for slidable movement and having one face thereof exposed to the operating fluid in said cavity and the other face thereof exposed to said ambient fluid, said piston member including a one-way check valve means connected to the face thereof exposed to said operating fluid, said check valve means being adapted to admit said operating fluid from said chamber to said space when said supply pressure exceeds said ambient pressure.